(12) United States Patent
Harada

(10) Patent No.: US 11,128,772 B2
(45) Date of Patent: Sep. 21, 2021

(54) IMAGE FORMING APPARATUS

(71) Applicant: KYOCERA Document Solutions Inc., Osaka (JP)

(72) Inventor: Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/827,955

(22) Filed: Mar. 24, 2020

(65) Prior Publication Data

US 2020/0314269 A1 Oct. 1, 2020

(30) Foreign Application Priority Data

Mar. 29, 2019 (JP) ............................. JP2019-066532
Mar. 29, 2019 (JP) ............................. JP2019-066546

(51) Int. Cl.
*H04N 1/00* (2006.01)
*H04N 1/16* (2006.01)

(52) U.S. Cl.
CPC ..... *H04N 1/00541* (2013.01); *H04N 1/00604* (2013.01); *H04N 1/16* (2013.01)

(58) Field of Classification Search
CPC .. H04N 1/00541; H04N 1/00604; H04N 1/16; H04N 1/00533; H04N 1/00535; H04N 1/00538; H04N 1/00559; H04N 1/19552; H04N 2201/02416
USPC ....... 358/1.11–1.18, 1.1, 906, 473, 505, 498, 358/508, 1.3
See application file for complete search history.

(56) References Cited

U.S. PATENT DOCUMENTS

| | | | | |
|---|---|---|---|---|
| 6,836,340 | B2 * | 12/2004 | Yoshihara | G03G 15/00 355/19 |
| 9,781,283 | B1 * | 10/2017 | Wilsher | H04N 1/00541 |
| 2002/0196481 | A1 * | 12/2002 | Manabe | H04N 1/00525 358/498 |
| 2006/0203293 | A1 * | 9/2006 | Yasue | H04N 1/00543 358/296 |
| 2006/0261539 | A1 * | 11/2006 | Terada | G03G 15/6502 271/162 |
| 2007/0047028 | A1 * | 3/2007 | Hashimoto | H04N 1/00543 358/498 |
| 2009/0122330 | A1 * | 5/2009 | Andoh | H04N 1/00525 358/1.13 |
| 2010/0141977 | A1 * | 6/2010 | Ueda | G03G 21/1628 358/1.13 |

FOREIGN PATENT DOCUMENTS

| | | | |
|---|---|---|---|
| JP | 2001-245117 | | 9/2001 |
| JP | 2001245117 A | * | 9/2001 |
| JP | 2008292807 A | * | 12/2008 |

* cited by examiner

*Primary Examiner* — Chad Dickerson
(74) *Attorney, Agent, or Firm* — Wenderoth, Lind & Ponack, L.L.P.

(57) ABSTRACT

An image forming apparatus includes a scanner device and an image forming apparatus body to which the scanner device is attached. The scanner device has a document inlet and a document outlet respectively formed in mutually opposed surfaces thereof, and is configured to read an image of a document fed thereinto through the document inlet and discharge the document through the document outlet. The scanner device is detachably attached to a top surface of the image forming apparatus body. The top surface of the image forming apparatus body functions as a guide surface guiding the document when the scanner device is used.

3 Claims, 14 Drawing Sheets

IMAGE FORMING APPARATUS

CROSS-REFERENCE TO RELATED APPLICATION(S)

This application is based upon and claims the benefit of priority from Japanese Patent Application No. 2019-066546 filed on Mar. 29, 2019 and Japanese Patent Application No. 2019-066532 filed on Mar. 29, 2019, the entire contents of which are incorporated herein by reference.

BACKGROUND

The technology disclosed herein relates to an image forming apparatus.

A portable, small-sized scanner device has been known. Such a scanner device has a device body and a reading unit attached to a top surface of the device body, and is configured to read an image of a document by causing the document to pass between the device body and the reading unit.

The reading unit has a contact image sensor that reads the image of the document, and a casing that covers the contact image sensor from above. The reading unit is attached to the top surface of the device body. The casing houses a pinch roller for conveying the document, which is arranged at the conveyance downstream side of the contact image sensor. The device body has a document conveyance roller that is arranged to face the pinch roller, and a motor that is coupled to the document conveyance roller via a gear train.

SUMMARY

An aspect of the present disclosure provides an image forming apparatus including a scanner device and an image forming apparatus body. The scanner device has a document inlet and a document outlet respectively formed in mutually opposed surfaces thereof, and is configured to read an image of a document fed thereinto through the document inlet and discharge the document through the document outlet. The scanner device is attached to the image forming apparatus body. The scanner device is detachably attached to a top surface of the image forming apparatus body. The top surface of the image forming apparatus body functions as a guide surface guiding the document when the scanner device is used.

DETAILED DESCRIPTION

Hereinafter, example embodiments of the present disclosure will be described in detail on the basis of the drawings. It should be understood that the technology disclosed herein is not limited to the embodiments described below.

Embodiment 1

[Overall Configuration]

Figure 1:
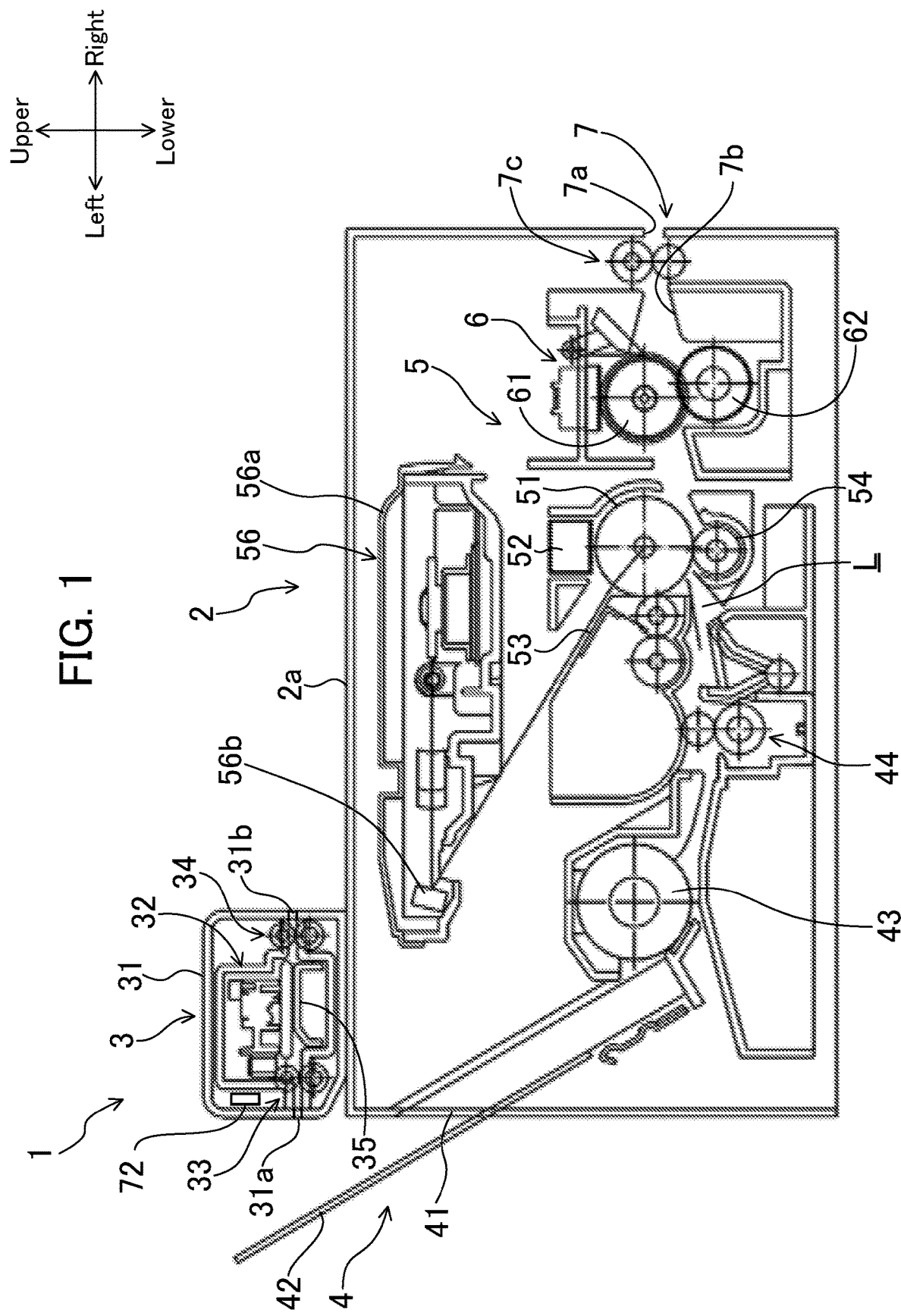
FIG. 1 is a schematic diagram illustrating the configuration of an image forming apparatus including a scanner device, which is configured according to an embodiment of the present disclosure.

FIG. 1 is a schematic sectional view illustrating the configuration of an image forming apparatus 1 according to Embodiment 1. The image forming apparatus 1 includes an image forming apparatus body 2 and a scanner device 3 as an optional device that is detachably attached to the image forming apparatus body 2.

The image forming apparatus body 2 includes a manual sheet feeding unit 4, an image forming unit 5, a fixing unit 6, and a sheet discharging unit 7. The image forming apparatus body 2 is configured to form an image on a sheet on the basis of given image data while conveying the sheet along a conveyance path L in the image forming apparatus body 2. The image data is composed of document image data read by the scanner device 3 or data transmitted from a terminal (not illustrated) or the like, e.g., a computer.

The manual sheet feeding unit 4 includes a sheet inlet 41 formed to open to a left side surface (one side surface connecting a top surface 2a and a bottom surface) of the image forming apparatus body 2, a sheet feed tray 42 attached to the sheet inlet 41, a pick-up roller 43 arranged adjacently to a lower end of the sheet feed tray 42, and a pair of sheet feed rollers 44 arranged on the right of the pick-up roller 43.

The sheet feed tray 42 is used for setting a sheet for printing thereon, and has a fixed tray part 42a (see FIG. 2) and an extension tray part 42b. The extension tray part 42b is pulled upward from the fixed tray part 42a for use when a sheet of a large size is to be set on the sheet feed tray 42. When extended to the maximum extent, the extension tray part 42b is positioned laterally of the scanner device 3. A sheet set on the sheet feed tray 42 is sent into the conveyance path L by the pick-up roller 43. The sheet sent into the conveyance path L by the pick-up roller 43 is nipped and conveyed by the pair of sheet feed rollers 44 so that it is fed into the image forming unit 5.

The image forming unit 5 is arranged on the right of the pair of sheet feed rollers 44. The image forming unit 5 includes a photosensitive drum 51 as an image carrier rotatably provided in the image forming apparatus body 2. Around the photosensitive drum 51, a charger 52, a developing unit 53, and a transfer roller 54 are disposed. Further, an optical scanning device 56 is disposed above the photosensitive drum 51. The optical scanning device 56 includes a polygon mirror 56a deflecting and scanning a laser beam emitted from a light source (not illustrated), and a turning mirror 56b reflecting a deflected and scanned light beam toward a surface of the photosensitive drum 51. The image forming unit 5 forms an image on a sheet fed thereinto from the manual sheet feeding unit 4, as described later.

The fixing unit 6 is arranged on the right of the image forming unit 5. The fixing unit 6 includes a fixing roller 61 and a pressure roller 62 that are rotated in a state of being pressed against each other. The fixing unit 6 is configured to fix a toner image, which is transferred onto a sheet in the image forming unit 5, on the sheet.

The sheet discharging unit 7 includes a sheet outlet 7a formed in a right side surface of the image forming apparatus body 2, a guide surface 7b guiding a sheet having passed through the fixing unit 6 to the sheet outlet 7a, and a pair of discharge rollers 7c arranged on the right of the guide surface 7b so as to discharge the sheet through the sheet outlet 7c.

Next, an image forming operation performed in the image forming apparatus 1 is generally described. Once the image forming apparatus 1 receives image data, the image forming unit 5 rotationally drives the photosensitive drum 51 and the charger 52 electrically charges the surface of the photosensitive drum 51. Further, the optical scanning device 56 applies a laser beam based on the image data to the electrically charged surface of the photosensitive drum 51.

Thereby, an electrostatic latent image corresponding to the image data is formed on the surface of the photosensitive drum 51. The electrostatic latent image formed on the surface of the photosensitive drum 51 is developed with an electrically charged toner in the developing unit 53 so that it is visualized as a toner image. When a sheet passes between transfer roller 54 and the photosensitive drum 51, the toner image migrates to the sheet due to a transfer bias that has a polarity opposite to that of the toner and is applied to the transfer roller 54. Thus, the toner image on the photosensitive drum 51 is transferred onto a sheet. The sheet having the toner image transferred thereon is heated and pressed by the fixing roller 61 and the pressure roller 62 in the fixing unit 6. Thereby, the toner image is fixed on the sheet. The sheet having the toner image fixed thereon is sent downstream by the fixing roller 61 and the pressure roller 62 and discharged out of the image forming apparatus body 2 through the sheet outlet 7a.

[Configuration of Scanner Device]

Figure 2:
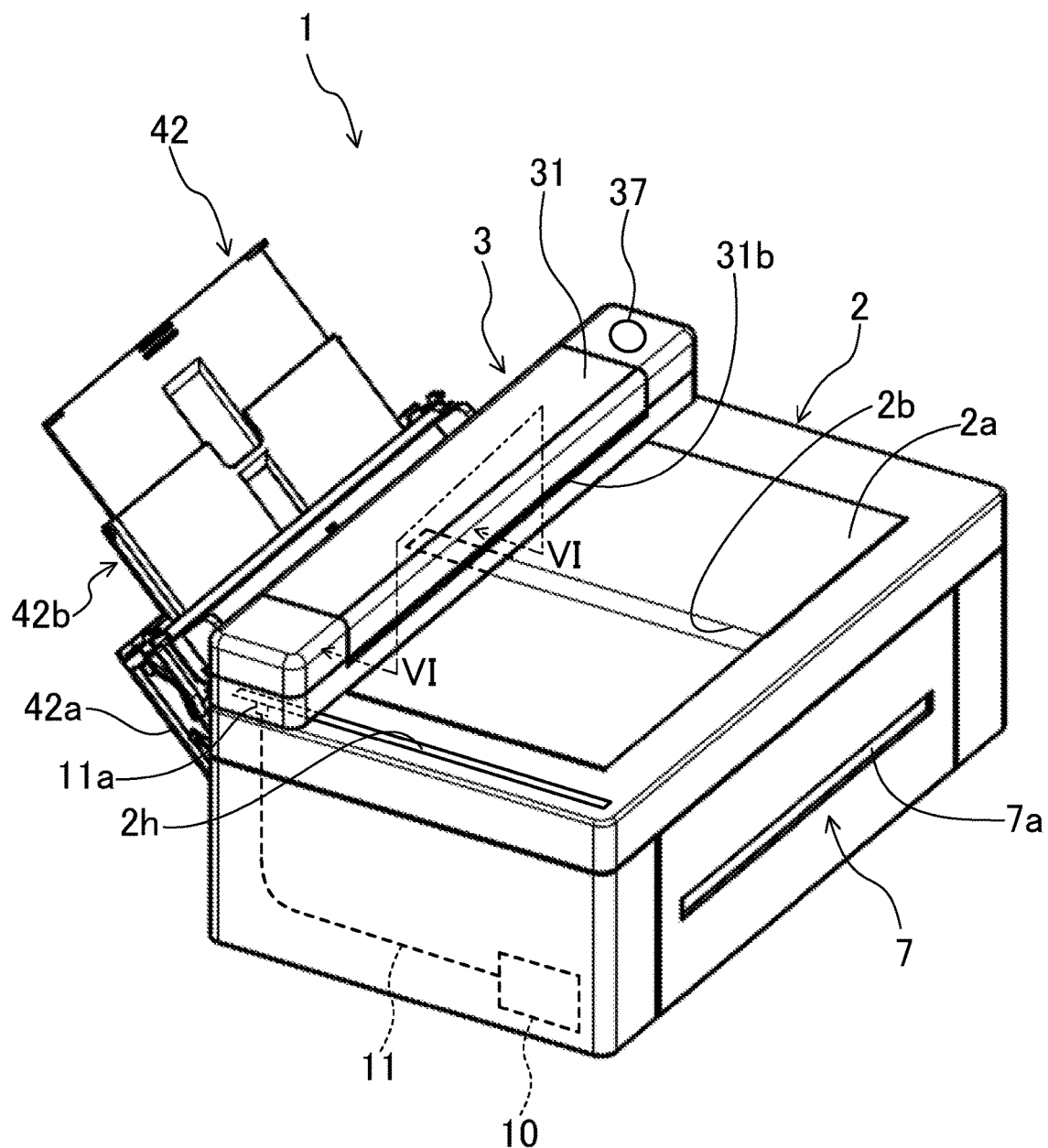
FIG. 2 is a perspective view of the appearance of the image forming apparatus as viewed from the front right side.
Figure 3:
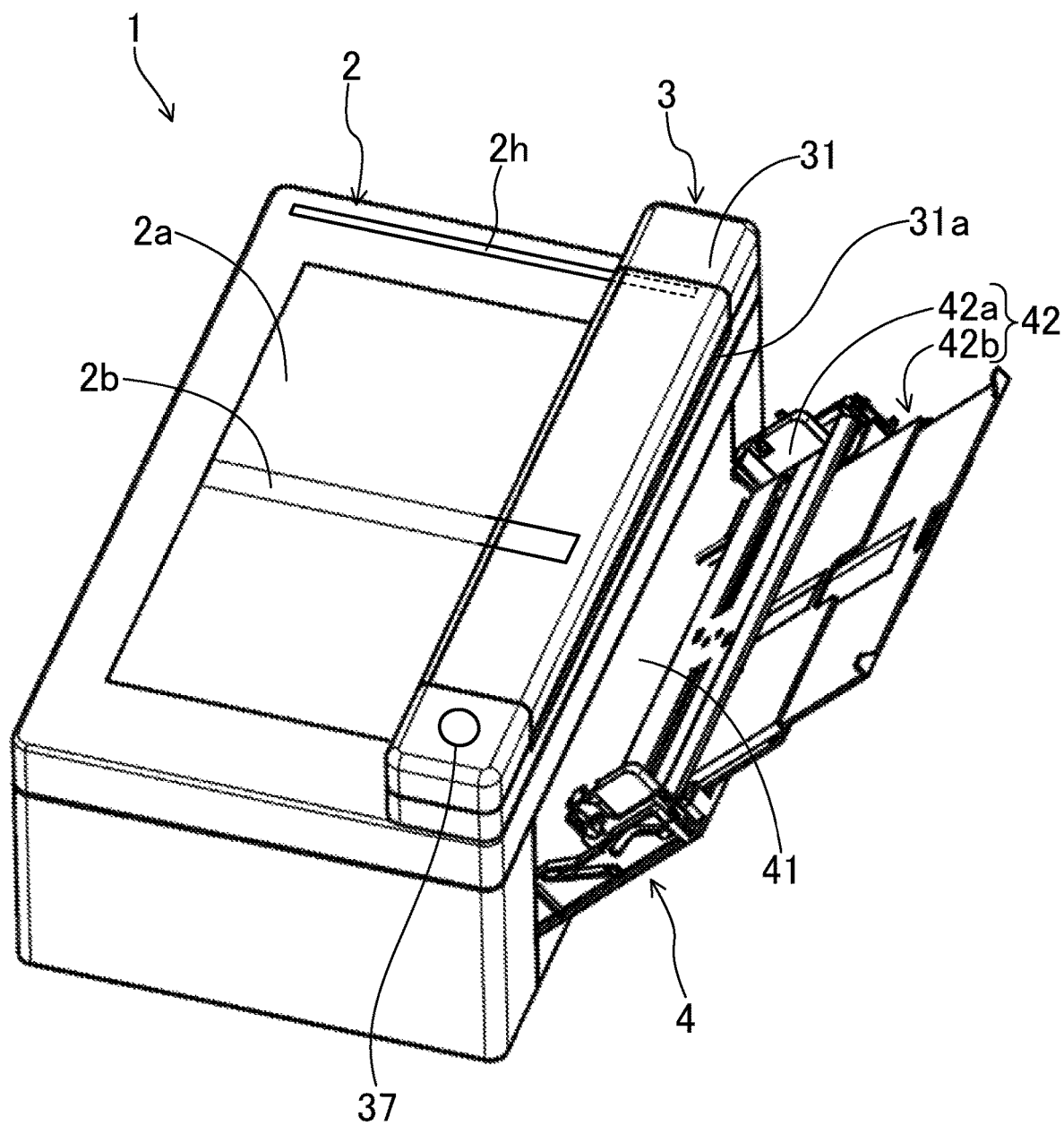
FIG. 3 is a perspective view of the appearance of the image forming apparatus as viewed from the rear left side.
Figure 4:
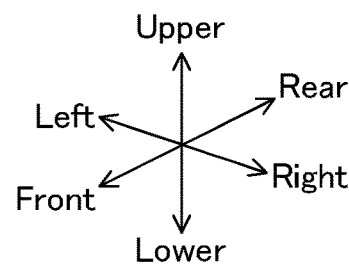
FIG. 4 is a perspective view corresponding to FIG. 2, with the scanner device slid to the right end from the left end on an image forming apparatus body.
Figure 4:
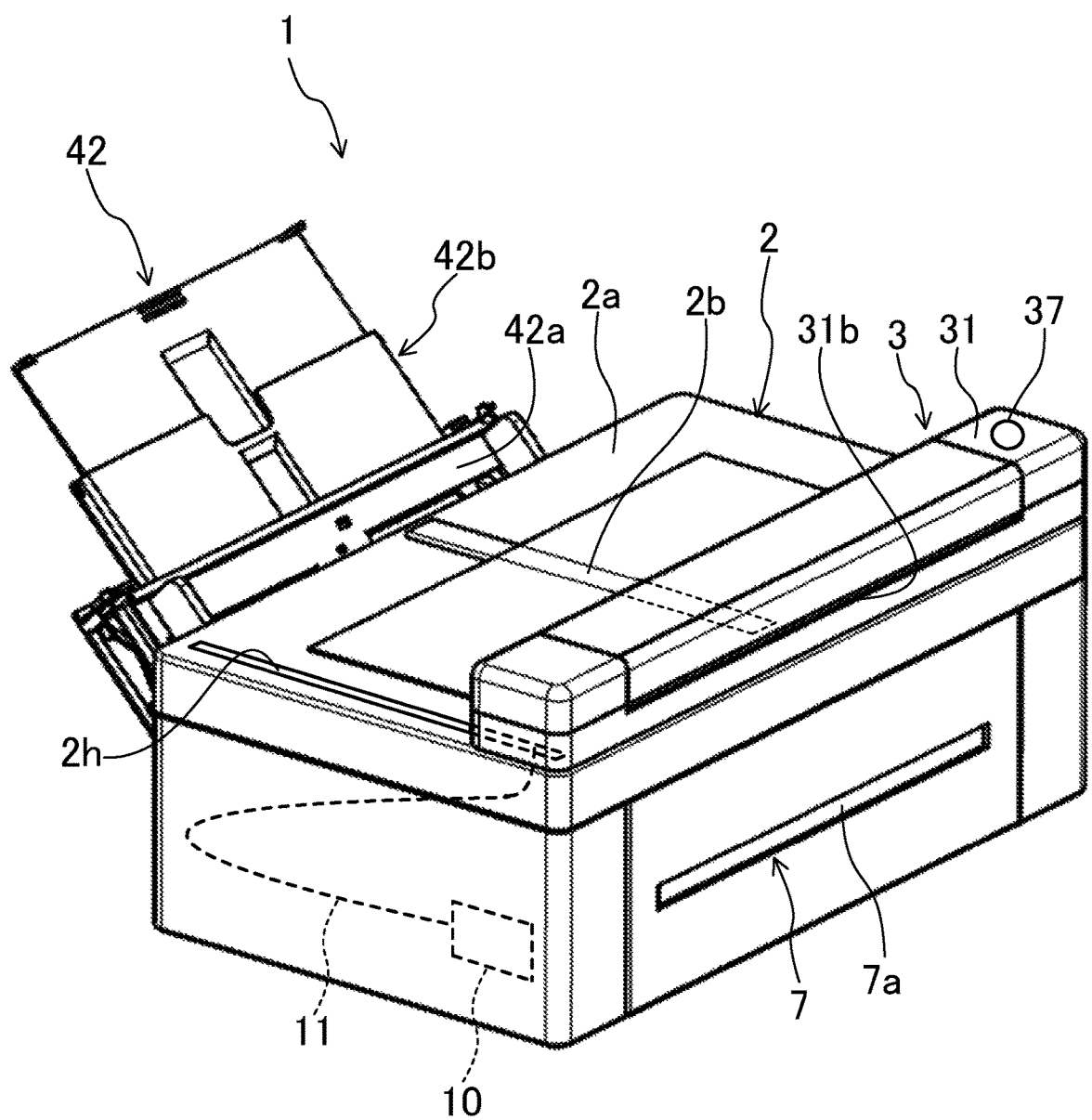

As shown in FIGS. 2 and 3, the scanner device 3 as an optional device retrofitted to the image forming apparatus body 2 is attached to the top surface 2a of the image forming apparatus body 2. The scanner device 3 includes a rectangular, box-shaped scanner housing 31 that extends along the full front-rear extent of the image forming apparatus body 2. The scanner housing 31 is configured to be slidable in the left-right direction on the top surface of the image forming apparatus body 2. FIG. 4 shows the scanner device 3 slid to a right end of the top surface 2a of the image forming apparatus body 2 from the position shown in FIG. 2. Details of the sliding mechanism of the scanner device 3 are described later.

The scanner housing 31 has a document inlet 31a formed in a left side surface thereof, and has a document outlet 31b formed in a right side surface thereof. The document inlet 31a and the document outlet 31b are each composed of a rectangular slit opening which extends in the front-rear direction and is capable om f receiving a document.

Figure 5A:
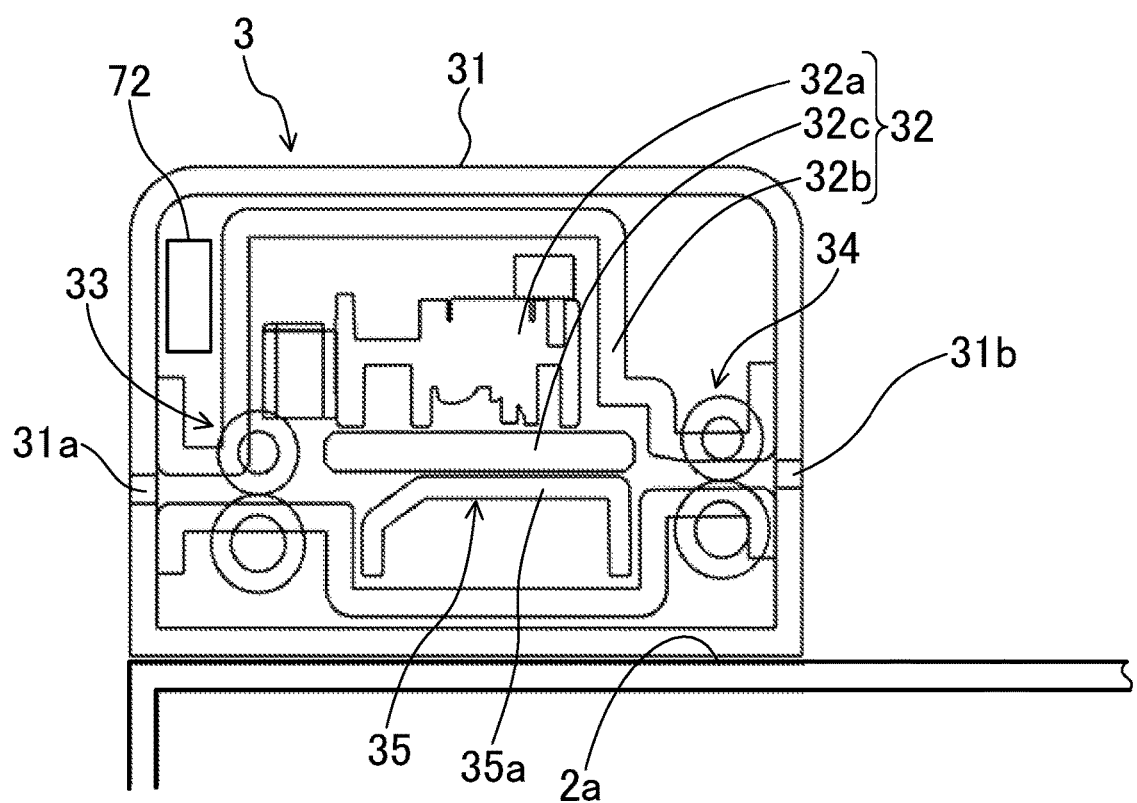
FIG. 5A is a vertical sectional view illustrating the internal configuration of the scanner device.

FIG. 5A illustrates the structure inside the scanner housing 31.

The scanner housing 31 houses a contact image sensor (hereinafter simply referred to as "CIS sensor") 32. The CIS sensor 32 includes a photodetector array 32a containing a number of photodetectors arrayed in a main-scanning direction (the front-rear direction), a light source (not illustrated), and a sensor casing 32b housing these optical elements. The sensor casing 32b is composed of a case-shaped member having an open bottom. The open bottom of the sensor casing 32b is covered with a transparent board 32c.

In the scanner housing 31, a guide member 35 is arranged at a position facing the transparent board 32c. The guide member 35 is composed of a member having a square, U-shaped cross section and extending in the front-rear direction. The guide member 35 is arranged such that a horizontal board 35a thereof faces the transparent board 32c of the CIS sensor 32 with a small clearance therebetween. When a document passes through this clearance, the CIS sensor 32 reads an image of the document.

In the scanner housing 31, a pair of sheet feed rollers 33 and a pair of sheet discharge rollers 34 are disposed on the left and right of the guide member 35, respectively. The pair of sheet feed rollers 33 and the pair of sheet discharge rollers 34 are driven by a motor 71, which is housed in the scanner housing 31, to nip and convey a document. The pair of sheet feed rollers 33 are arranged such that the nip thereof faces the document inlet 31a. The pair of sheet discharge rollers 34 are arranged such that the nip thereof faces the document outlet 31b.

Figure 5B:
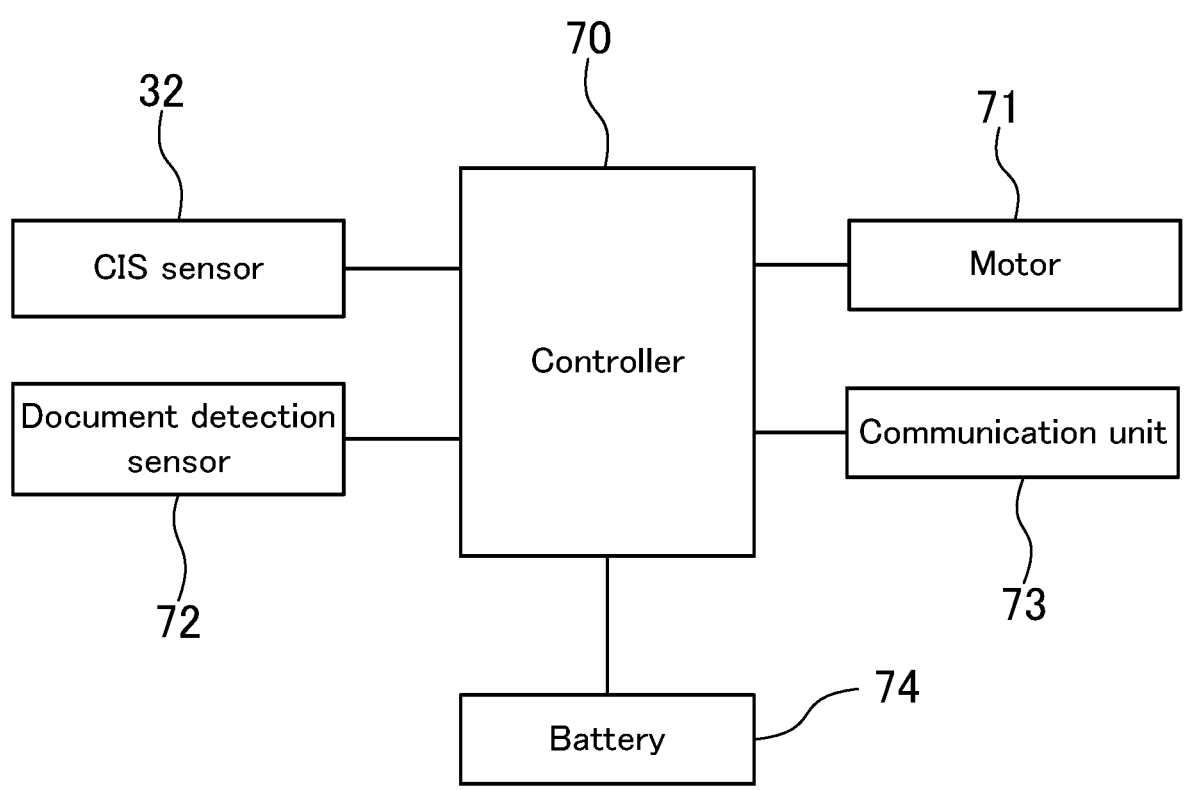
FIG. 5B is a block diagram illustrating controls of the scanner device.

The scanner housing 31 further houses a controller 70 (shown in FIG. 5B only). The controller 70 is composed of a microcomputer including a CPU, a ROM, and a RAM.

As shown in FIG. 5B, the controller 70 is connected to the CIS sensor 32, the motor 71, a document detection sensor 72, a communication unit 73, and a battery 74.

The motor 71 drives the pair of sheet feed rollers 33 and the pair of sheet discharge rollers 34 upon receipt of an instruction from the controller 70. The document detection sensor 72 detects the presence and absence of a document is present on a conveyance path at the upstream side of the nip of the pair of sheet feed rollers 33, and transmits a detection signal to the controller 70. The communication unit 73 transmits document image data read by the scanner device 3 to the image forming apparatus 1 upon receipt of an instruction from the controller 70. The battery 74 supplies power to the controller 70, the motor 71, the document detection sensor 72, and the communication unit 73.

The scanner device 3 has a power button 37 (see FIG. 2) for switching between an ON state where power is supplied by the buttery 74 and an OFF state where the supply of power by the buttery 74 is interrupted. The power button 37 is exposed at a rear end of an outer surface of the scanner device 3 (a top surface of the scanner housing 31) so that the user can press it with his/her finger.

Note that a configuration may be employed in which the battery 74 is not provided and a power source for the image forming apparatus body 2 is used also as a power source for the scanner device 3. In this case, wires extending from the power source for the image forming apparatus body 2 are connected to the scanner device 3 so that the scanner device 3 can be turned on and off in conjunction with turning-on and turning-off of a power button (not illustrated) of the image forming apparatus 1.

[Document Image Reading Operation by Scanner Device]

To cause the scanner device 3 to read an image of a document, the user sets the document at the nip of the pair of sheet feed rollers 33 when the scanner device 3 has been turned on and is in a standby state. Thereby, the document detection sensor 72 is brought into an ON state (a state where the presence of the document is detected). When the ON state of the document detection sensor 72 has continued for a predetermined period of time (for example, 2 to 3 seconds), the controller 70 starts to rotationally drive the pair of sheet feed rollers 33 and the pair of sheet discharge rollers 34.

Note that a configuration may be employed in which a start key (not illustrated) is provided on the outer surface of the scanner device 3 and the controller 70 starts to rotationally drive the pair of sheet feed rollers 33 and the pair of sheet discharge rollers 34 when detecting that the start key is operated with the document detection sensor 72 in the ON state.

The rotation of the pair of sheet feed rollers 33 and the pair of sheet discharge rollers 34 causes the document to pass through the CIS sensor 32, during which the CIS sensor 32 reads a surface image of the document. The controller 70 analyzes the surface image read by the CIS sensor 32 and generates image data thereof, and transmits the generated image data to the controller 10 in the image forming apparatus body 2 (see FIG. 2) via the communication unit 73. The controller 10 in the image forming apparatus body 2 conducts the image forming operation on a sheet on the basis of the image data transmitted thereto from the controller 70 of the scanner device 3. Note that the image data may be stored into a storage medium which is provided in the image forming apparatus body 2, or may be transmitted to an external device which is connected to the image forming apparatus body 2 through a communication network.

When a predetermined period of time (estimated amount of time required for a rear end of the document to pass through the pair of sheet discharge rollers 34 after passing through immediately under the document detection sensor 72) has elapsed after the document detection sensor 72 is brought into an OFF state (a state where the absence of the document is detected) from the ON state, the controller 70 stops the rotational driving of the pair of sheet feed rollers 33 and the pair of sheet discharge rollers 34 at a predetermined timing, whereby the scanner device 3 is brought into the standby state from the image reading state. Note that the controller 70 may be configured to use an image signal from the CIS sensor 32 to detect that the rear end of the document has passed through the CIS sensor 32 and control the timing of stopping the rotational driving of the pair of sheet feed rollers 33 and the pair of sheet discharge rollers 34.

Note that an image forming apparatus as shown in Embodiment 4 described later (see FIG. 14), which has a configuration in which a top surface (document feed surface part 102d) of an image forming apparatus body 102 is connected to a document inlet 131a, may be configured such that the conveyance of the document having passed through the CIS sensor 32 is stopped before the document passes through the nip of the pair of sheet discharge rollers 34, and then the motor 71 is reversely rotated so that the document is switched back and discharged onto the top surface (document feed surface part 102d) of the image forming apparatus body 102.

[Detection of Malfunction in Scanner Device]

The controller 70 is configured to, when the document having passed through the CIS sensor 32 is not detected by the document detection sensor 72 or the CIS sensor 32 even though the predetermined period of time has elapsed since the start of the rotational driving of the pair of sheet feed rollers 33 and the pair of sheet discharge rollers 34, judge that a multifunction occurs in the scanning device 3 and stop the rotational driving of the pair of sheet feed rollers 33 and the pair of sheet discharge rollers 34.

Note that the CIS sensor 32 is also capable of detecting a document conveyance condition (for example, a moving speed of the document) on the basis of the surface image of the document. By utilizing this capability, the controller 70 may be configured to judge that a multifunction occurs in the scanner device 3 and stop the rotational driving of the pair of sheet feed rollers 33 and the pair of sheet discharge rollers 34, for example, when the speed of conveyance of the document is equal to or less than a predetermined speed.

Note that, in the case where the aforementioned configuration in which the start key is provided is employed, the reading operation by the CIS sensor 32 may be started when a predetermined period of time has elapsed after a signal indicative of the start key being pressed is detected by the controller 70.

Figure 6:
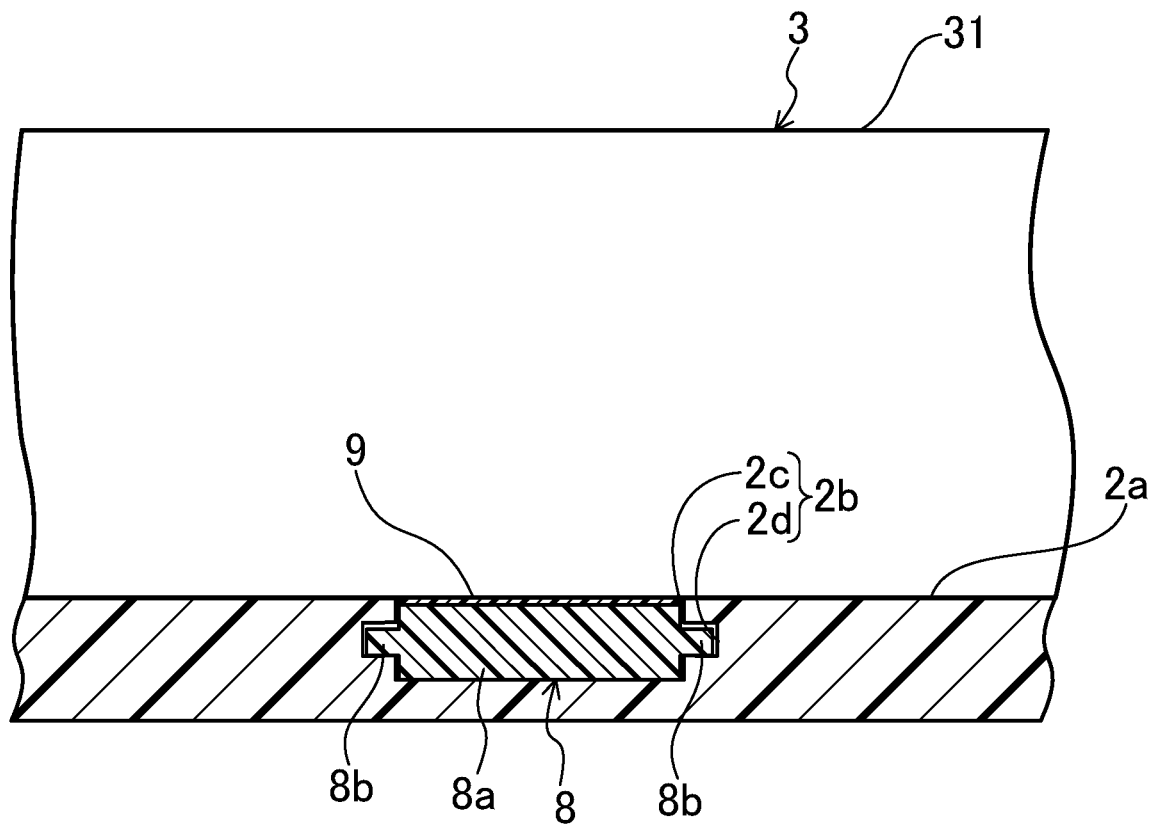
FIG. 6 is a sectional view taken along line VI-VI in FIG. 2.
Figure 7:
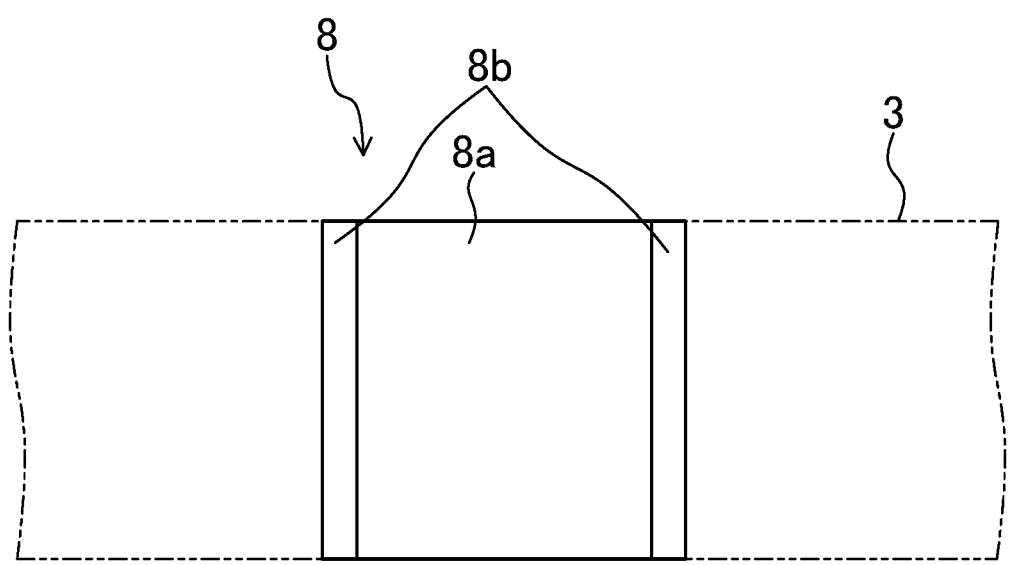
FIG. 7 is a plan view of a slider shown in FIG. 6 as viewed from above.

Next, the sliding mechanism of the scanner device 3 is described with reference to FIGS. 6 and 7. The scanner device 3 is fixed to a slider 8 that is movable in the left-right direction on the top surface of the image forming apparatus body 2. A fixation member 9 is interposed between the scanner device 3 and the slider 8. The fixation member 9 is composed of, for example, a double-sided tape or a magnet, and fixes the scanner device 3 to the slider 8.

The slider 8 is disposed in a rail groove 2b (see FIG. 2, etc.) formed in the top surface of the image forming apparatus body 2. The slider 8 has a rectangular, plate-shaped slider body 8a and a pair of engagement protrusions 8b. The pair of engagement protrusions 8b respectively protrude from the centers in a thickness direction of both end surfaces in a width direction of the slider body 8a.

The rail groove 2b linearly extends in the left-right direction at the center in the front-rear direction in the top surface 2a of the image forming apparatus body 2. The rail groove 2b has a groove body 2c that receives the slider body 8a of the slider 8, and engagement grooves 2d that are respectively formed as recesses in both side surfaces in a width direction of the groove body 2c so as to respectively engage with the pair of engagement protrusions 8b of the slider 8. The pair of engagement protrusions 8b respectively engaging with the engagement grooves 2d prevents the slider 8 from being detached upward from the rail groove 2b.

When the scanner device 3 is retrofitted to the image forming apparatus body 2, the fixation member 9 is first attached to a top surface of the slider body 8a of the slider 8 and then a bottom surface of the scanner housing 31 of the scanner device 3 is brought into contact with the fixation member 9 and fixed thereto; thus, the scanner device 3 is fixed to the slider 8. The scanner device 3 can be moved between a left end and a right end of the top surface 2a of the image forming apparatus body 2 by sliding the slider 8 in the rail groove 2b. In other words, the scanner device 3 is movable between an end located on the sheet feed tray 42 side and an end located on the side opposite to the sheet feed tray 42 side on the top surface 2a of the image forming apparatus body 2.

When the scanner device 3 attached to the slider 8 is slid in the left-right direction, it is necessary to cause wires 11 (see FIG. 2) connecting the scanner device 3 and the image forming apparatus body 2 to follow the movement of the scanner device 3. Accordingly, in this embodiment, an opening 2h extending in the left-right direction is formed in a top plate of the image forming apparatus body 2 so that the wires 11 can move in the left-right direction in the opening 2h.

The wires 11 consist of, for example, a USB cable. One end of the wires 11 is connected to the controller 10 in the image forming apparatus body 2. The other end of the wires 11 has a communication connector 11a provided thereon. The communication connector 11a is detachably connected to an insertion port (not illustrated) provided in the bottom surface of the scanner device 3. The scanner device 3 transmits document image data to the controller 10 in the image forming apparatus body 2 through the USB cable connected to the insertion port. Note that the standard for the communication connector is not limited to the USB standard.

[Operational Effects of Embodiment 1]

In Embodiment 1, as described above, the scanner device 3 is detachably attached to the top surface 2a of the image forming apparatus body 2 and the top surface 2a of the image forming apparatus body 2 functions as a guide surface guiding a document when the scanner device 3 is used.

This configuration allows a copying function to be added to the image forming apparatus 1, which has only a printing function, just by additionally attaching the scanner device 3 later to the image forming apparatus 1. Therefore, costs can be saved in comparison to purchasing a new copying machine.

Further, the scanner device 3 is configured to be slidable in the left-right direction (example of predetermined direction) along the top surface 2a of the image forming apparatus body 2 in the state of being attached to the top surface 2a of the image forming apparatus body 2.

This configuration in which the scanner device 3 is not fixed to the image forming apparatus body 2 but is slidable in the left-right direction on the image forming apparatus body 2 allows the user to move the scanner device 3 to his/her desired position. Therefore, for example, where there is a risk of interference between the scanner device 3 and a peripheral member (e.g., a piece of OA equipment, a shelf, etc.), the scanner device 3 can be moved to a position such that it does not interfere with the peripheral member, so that the image forming apparatus body 2 can be placed at a desired position. Thus, the degree of freedom for placement of the image forming apparatus 1 is prevented from being restricted by the scanner device 3 attached to the image forming apparatus body 2.

Further, the scanner device 3 is configured to be slidable between the end located on the sheet feed tray 42 side and the end located on the side opposite to the sheet feed tray 42 side on the top surface of the image forming apparatus body 2.

With this configuration, when setting a sheet on the sheet feed tray 42, the user can move the scanner device 3 to the side opposite to the sheet feed tray 42 side to position the scanner device 3 at a position such that the user's operation is not hindered by the scanner device 3. Particularly when setting a sheet of a large size on the sheet feed tray 42, the user's operation is often hindered by the extension tray part 42b; therefore, this configuration is very helpful.

Furthermore, in this embodiment, the scanner device 3 is configured as an optional device attachable to the image forming apparatus body 2.

This configuration allows the scanner device 3 to be added later to the image forming apparatus 1 which has, for example, only a printing function. Therefore, the user can reduce the initial cost for purchasing the image forming apparatus 1 and also can add a copying function later in response to change in the usage environment.

Embodiment 2

Figure 8:
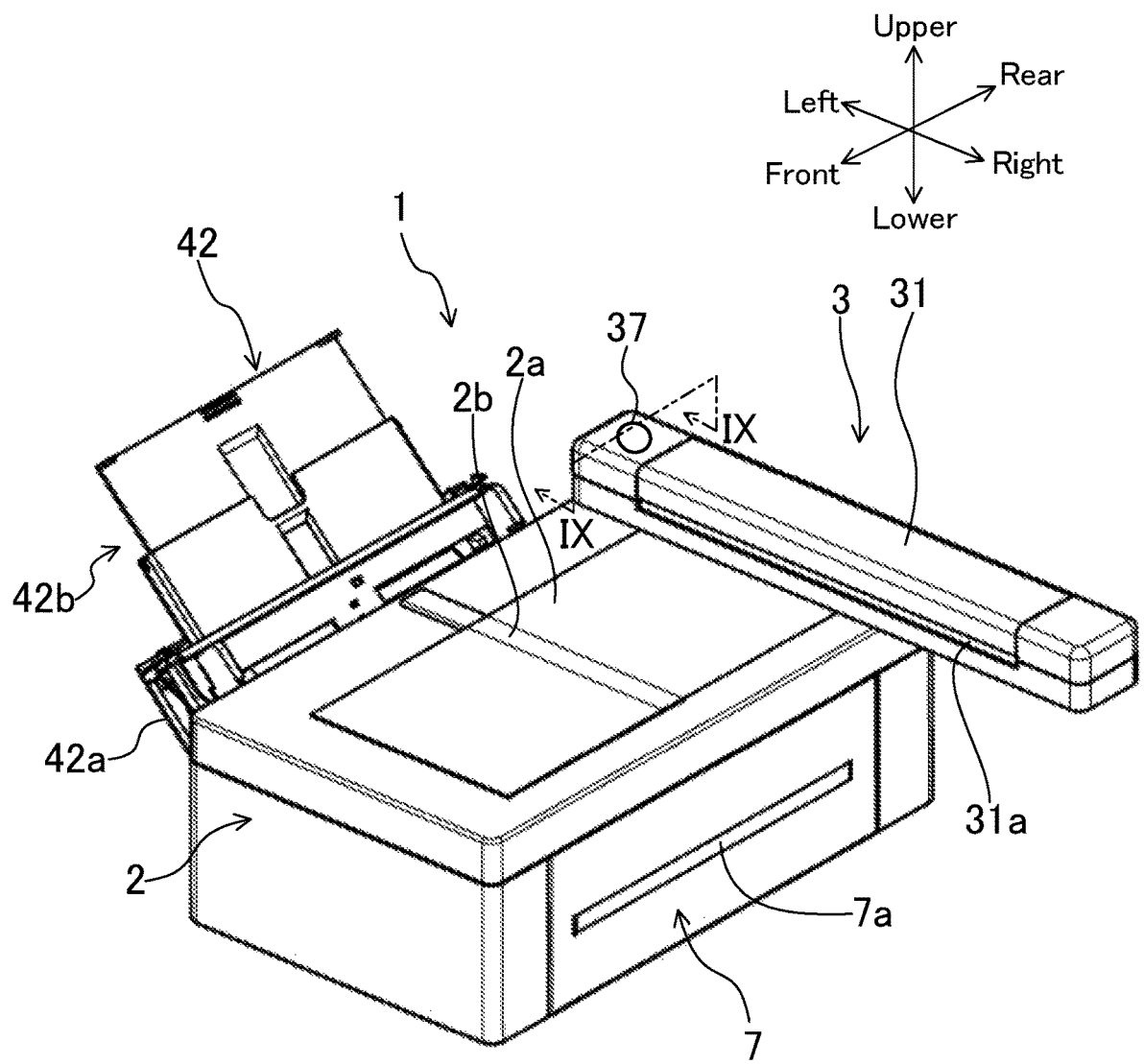
FIG. 8 illustrates Embodiment 2 correspondingly to FIG. 4.

FIG. 8 illustrates Embodiment 2 correspondingly to FIG. 4. Embodiment 2 is different from Embodiment 1 in that the scanner device 3 is not linearly moved but rotationally moved. Note that, in the description of Embodiment 2 below, components identical to those in Embodiment 1 are denoted by the same reference numerals as in Embodiment 1 so that detailed description thereof is omitted.

Specifically, in this embodiment, the scanner device 3 is configured to be rotationally movable about a corner (in this embodiment, a rear left corner) of the top surface 2a of the image forming apparatus body 2 after the scanner housing 31 is attached to the top surface 2a of the image forming apparatus body 2.

Figure 9:
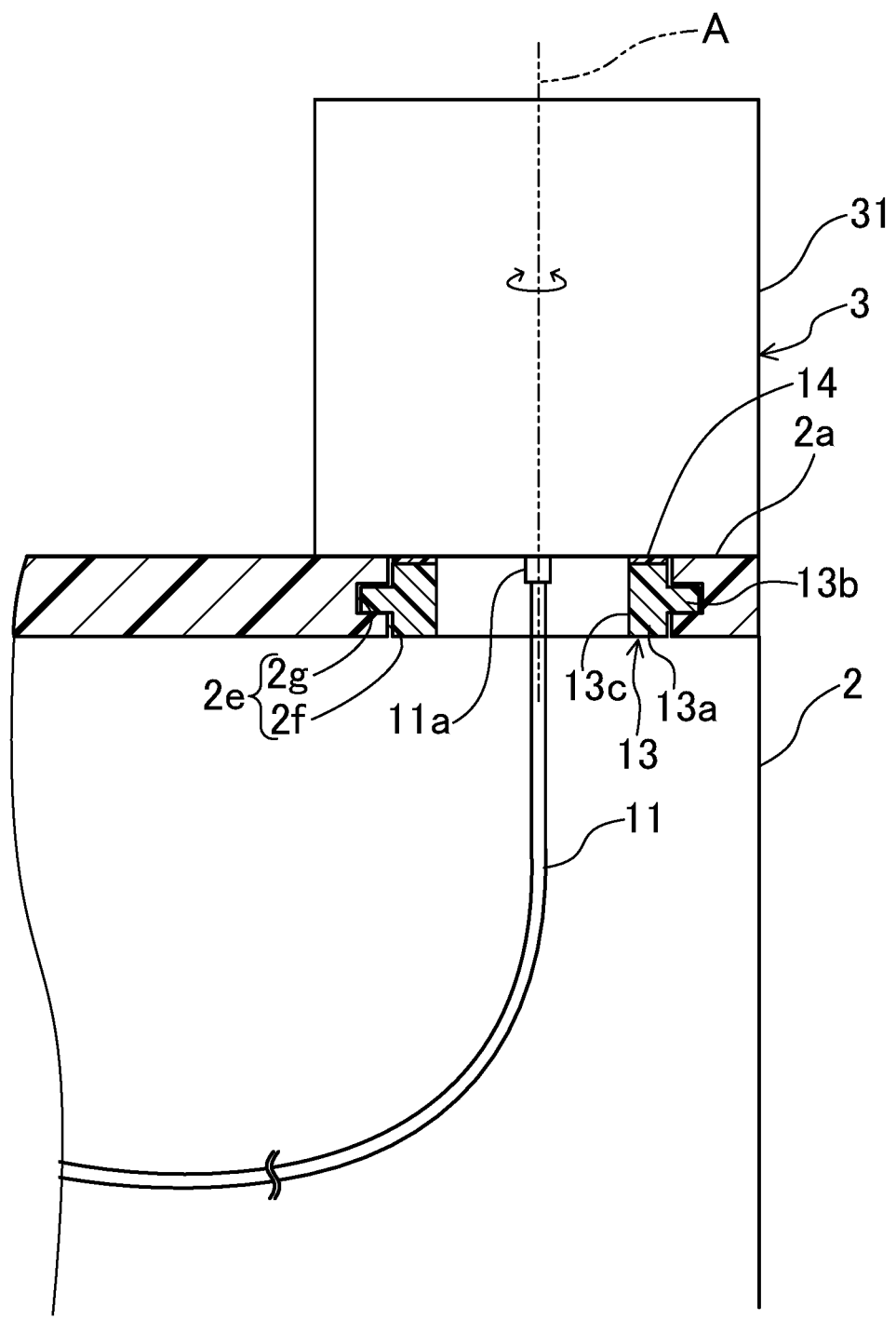
FIG. 9 is a sectional view taken along line IX-IX in FIG. 8.

A specific example of the structure for attaching the scanner device 3 to the image forming apparatus body 2 is described with reference to FIG. 9. In this example, a fitting hole 2e for fitting a rotation support member 13 therein is formed in a top wall of the image forming apparatus body 2.

The rotation support member 13 has an annular part 13a and an engagement protrusion 13b protruding outward in a radial direction from the center in a thickness direction of an outer peripheral surface of the annular part 13a.

The fitting hole 2e has a circular hole 2f for rotatably receiving the annular part 31a therein, and an engagement groove 2g formed in an inner peripheral surface of the circular hole 2f to extend throughout the entire periphery of the inner peripheral surface. The engagement protrusion 13b of the rotation support member 13 is engaged with the engagement groove 2g of the fitting hole 2e, whereby the rotation support member 13 is unreleasably held in the fitting hole 2e.

The scanner device 3 is fixed to a top surface of the annular part 13a of the rotation support member 13 with a fixation member 14 interposed therebetween. Similarly to Embodiment 1, for example, a double-sided tape or a magnet is used as the fixation member 14. The scanner device 3 is configured to be rotationally movable between a left end and a rear end of the top surface 2a of the image forming apparatus body 2 about an axis A of the rotation support member 13. In other words, the scanner device 3 is configured to be rotatable between a position (not shown) at which it extends parallel to an edge located on the sheet feed tray 42 side and a position (shown in FIG. 8) at which it extends perpendicularly to the edge on the top surface of the image forming apparatus body 2 as viewed in plan view.

The scanner device 3 has an insertion port (not illustrated) provided in the bottom surface thereof, which is fitted with the communication connector 11a of the wires 11. The insertion port is located on the axis A of the rotation support member 13 as viewed in plan view. The communication connector 11a of the wires 11 is connected to the insertion port through an opening 13c inside the rotation supporting member 13 (see FIG. 9).

[Operational Effects of Embodiment 2]

In Embodiment 2, as described above, the scanner device 3 is detachably attached to the top surface 2a of the image forming apparatus body 2 and the top surface 2a of the image forming apparatus body 2 functions as a guide surface guiding a document when the scanner device 3 is used.

This configuration allows a copying function to be added to the image forming apparatus 1, which has only a printing function, just by additionally attaching the scanner device 3 later to the image forming apparatus 1. Therefore, costs can be saved in comparison to purchasing a new copying machine.

Further, the scanner device 3 is configured to be rotatable about the axis A of the rotation support member 13, which is vertical to the top surface 2a of the image forming apparatus body 2, in the state of being attached to the top surface 2a of the image forming apparatus body 2.

With this configuration, for example, where there is a risk of interference between the scanner device 3 and a peripheral member (e.g., a piece of OA equipment, a shelf, etc.), the scanner device 3 can be rotationally moved so as to avoid such interference, so that the image forming apparatus body 2 can be placed at a desired position. Therefore, this configuration provides the same operational effect as that in Embodiment 1.

Furthermore, in this embodiment, the wires 11 extending from the controller 10 in the image forming apparatus body 2 are connected to the scanner device 3 through the inside of the annular part 13a (opening 13c) of the rotation support member 13. Therefore, differently from Embodiment 1, it is not necessary to form the slit opening 2h in the top surface of the image forming apparatus body 2 so as to cause the wires 11 to follow the movement of the scanner device 3. This allows the image forming apparatus body 2 to be sealed, so that the image forming apparatus 1 is prevented from braking down due to dust or the like.

Embodiment 3

Figure 10:
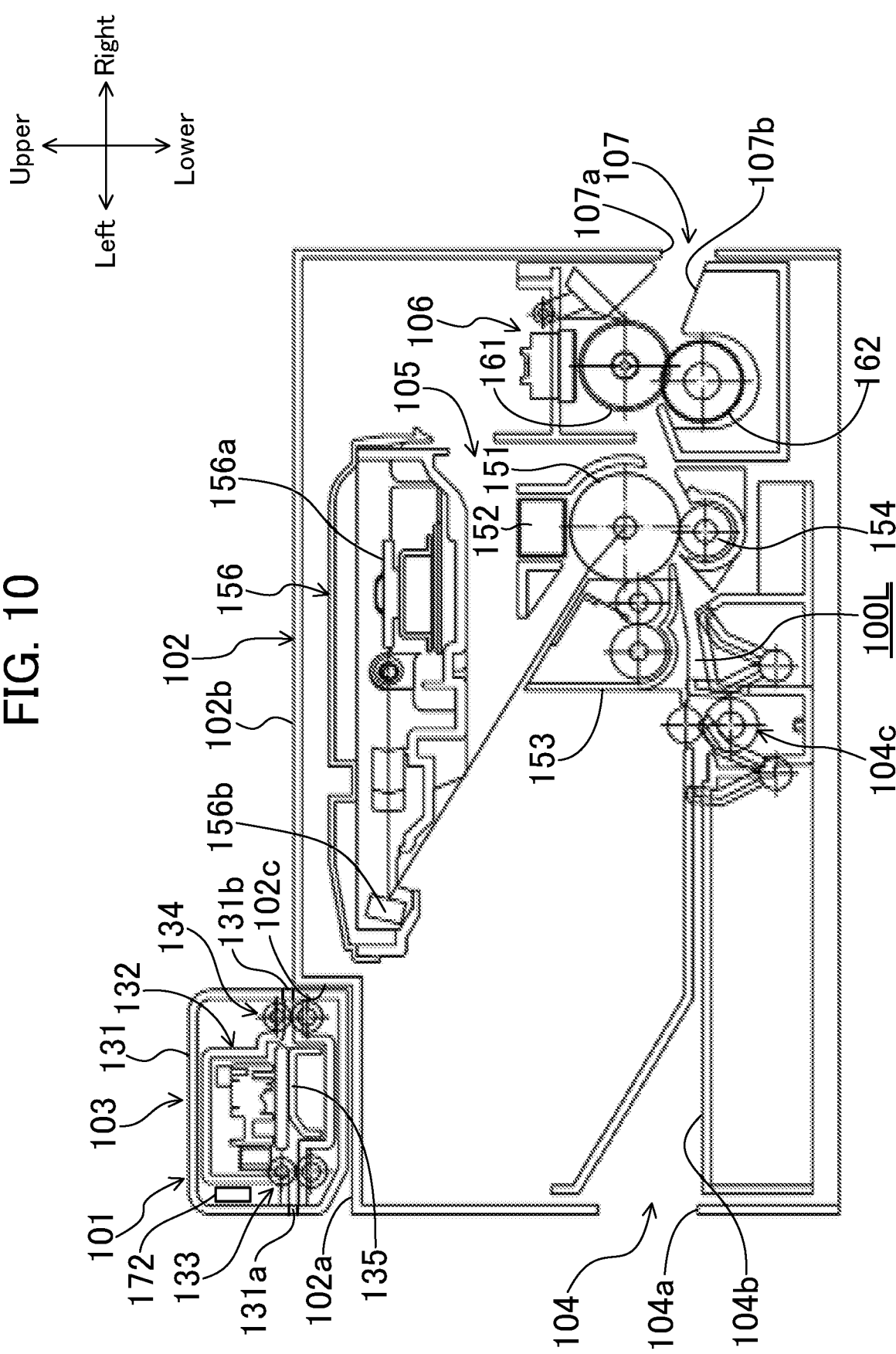
FIG. 10 illustrates Embodiment 3 correspondingly to FIG. 1.

FIG. 10 illustrates Embodiment 3 correspondingly to FIG. 1. In the description of Embodiment 3, components identical to those in Embodiment 1 are denoted by the same reference numerals as in Embodiment 1 plus 100. Embodiment 3 is different from Embodiments 1 and 2 in that a scanner device 103 is attached to the image forming apparatus body 102 differently.

The image forming apparatus body 102 includes a manual sheet feeding unit 104, an image forming unit 105, a fixing unit 106, and a sheet discharging unit 107. The image forming apparatus body 102 is configured to form an image on a sheet on the basis of given image data while conveying the sheet along a conveyance path 100L in the image forming apparatus body 102. The image data is composed of document image data read by the scanner device 103 or data transmitted from a terminal (not illustrated) or the like, e.g., a computer.

The manual sheet feeding unit 104 includes a sheet inlet 104a formed to open to a left side surface of the image forming apparatus body 102, a guide tray 104b, and a pair of sheet feed rollers 104c arranged adjacently to a right end (an end located on the downstream side in the sheet conveying direction) of the guide tray 104b. A sheet manually fed into the guide tray 104b through the sheet inlet 104a is nipped and conveyed by the pair of sheet feed rollers 104c so that it is fed into the image forming unit 105.

The image forming unit 105 is arranged on the right of the pair of sheet feed rollers 104c. The image forming unit 105 includes a photosensitive drum 151 as an image carrier rotatably provided in the image forming apparatus body 102. Around the photosensitive drum 151, a charger 152, a developing unit 153, and a transfer roller 154 are disposed. Further, an optical scanning device 156 is disposed above the photosensitive drum 51. The optical scanning device 156 includes a polygon mirror 156a deflecting and scanning a laser beam emitted from a light source (not illustrated), and a turning mirror 156b reflecting a deflected and scanned light beam toward a surface of the photosensitive drum 151. The image forming unit 105 forms an image on a sheet fed thereinto from the manual sheet feeding unit 104, as described later.

The fixing unit 106 is arranged on the right of the image forming unit 105. The fixing unit 106 includes a fixing roller 161 and a pressure roller 162 that are rotated in a state of being pressed against each other. The fixing unit 106 is configured to fix a toner image, which is transferred onto a sheet in the image forming unit 105, on the sheet.

The sheet discharging unit 107 includes a sheet outlet 107a formed in a right side surface of the image forming apparatus body 102, and a guide surface 107b guiding a sheet having passed through the fixing unit 106 to the sheet outlet 107a.

The image forming operation performed in the image forming apparatus 101 is the same as that in the image forming apparatus 1 according to Embodiment 1; therefore, detailed description thereof is omitted.

[Configuration of Scanner Device]

Figure 11:
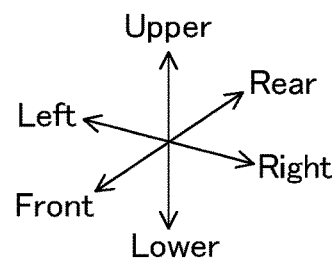
FIG. 11 is a perspective view of an image forming apparatus as viewed obliquely from the front right side.
Figure 11:
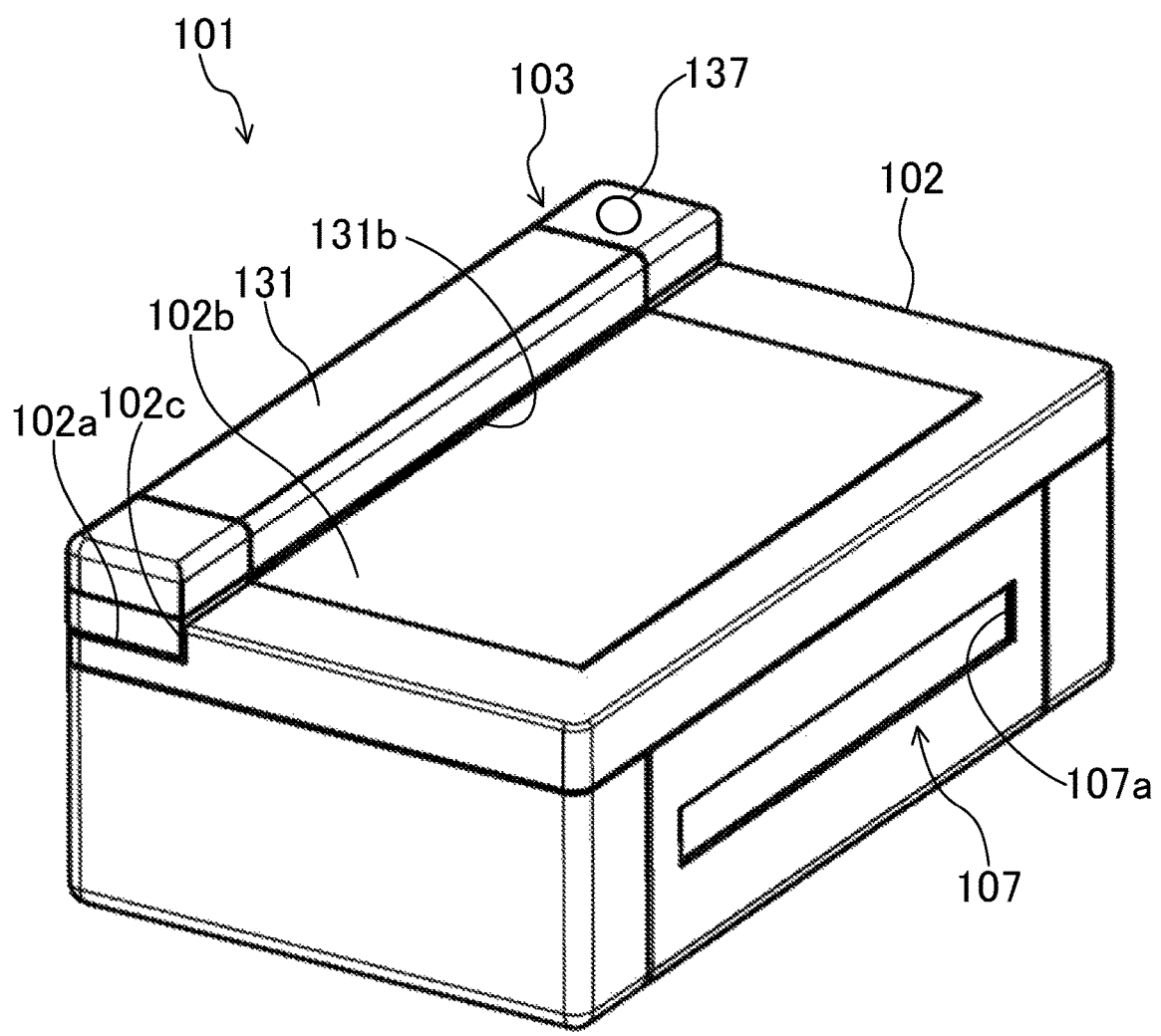
Figure 12:
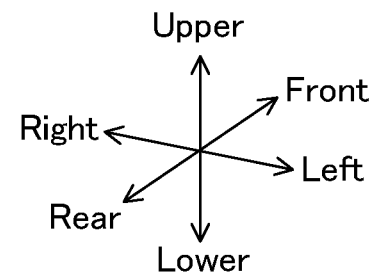
FIG. 12 is a perspective view of the image forming apparatus as viewed obliquely from the rear left side.
Figure 12:
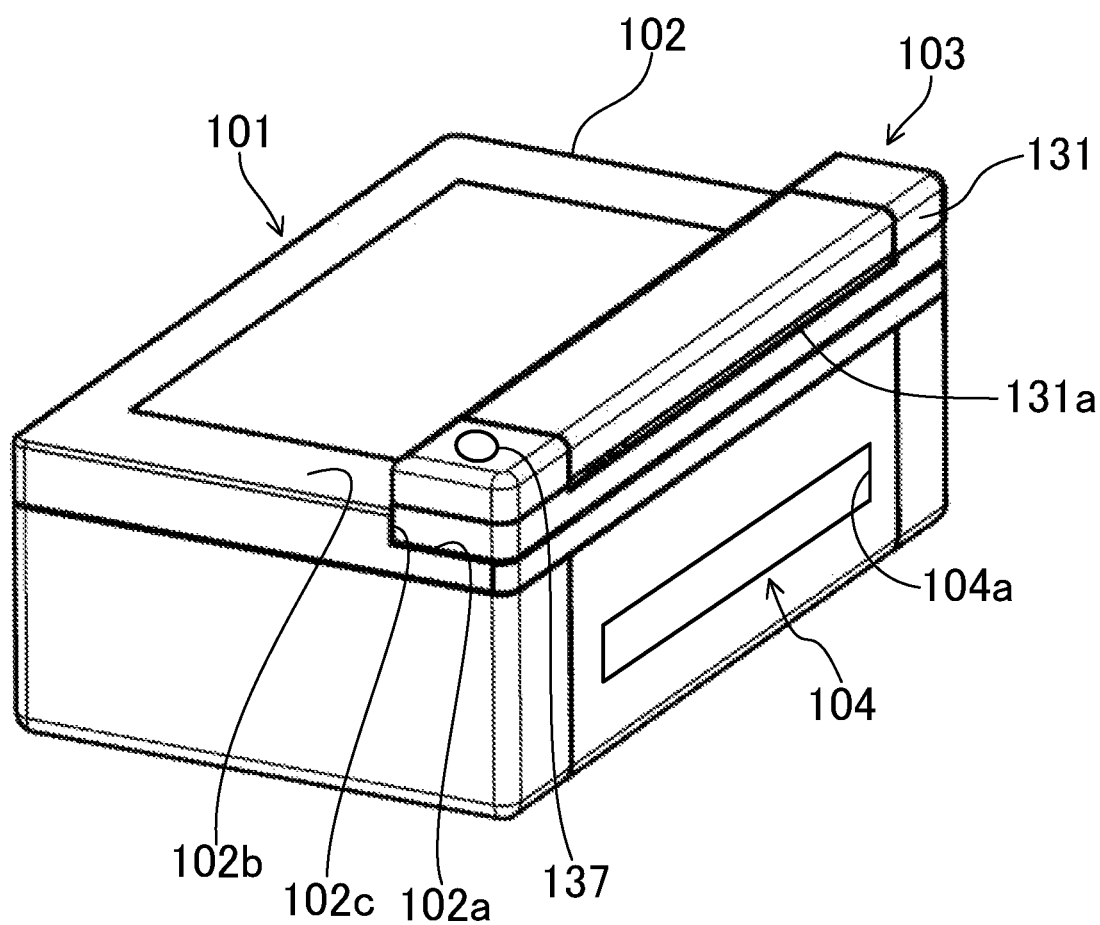

As shown in FIGS. 10 to 12, the scanner device 103 is fixed to a scanner attachment surface part 102a of a top surface of the image forming apparatus body 102. The scanner device 103 is fixed by means of, for example, a screw or the like. The scanner device 103 is connected to the controller 10 in the image forming apparatus body 102 with a USB cable (not illustrated). The USB cable extends along an inner wall surface of the image forming apparatus body 102 from the controller 10, and can be pulled out of the image forming apparatus body 102 through a through hole (not illustrated) formed in the scanner attachment surface part 102a. The USB cable has a communication connector provided on an end thereof pulled out through the though hole. The communication connector is detachably connected to an insertion port provided in a bottom surface of the scanner device 103. The scanner device 103 transmits document image data to the controller 10 in the image forming apparatus body 102 through the USB cable connected to the insertion port. Note that the standard for the communication connector is not limited to the USB standard.

As shown in FIGS. 11 and 12, the scanner device 103 includes a rectangular, box-shaped scanner housing 131 that extends along the full longitudinal (front-rear) extent of the scanner attachment surface part 102a. The scanner housing 131 has a document inlet 131a formed in a left side surface thereof, and has a document outlet 131b formed in a right side surface thereof. The document inlet 131a and the document outlet 131b are each composed of a rectangular slit opening which extends in the front-rear direction and is capable of receiving a document.

Figure 13:
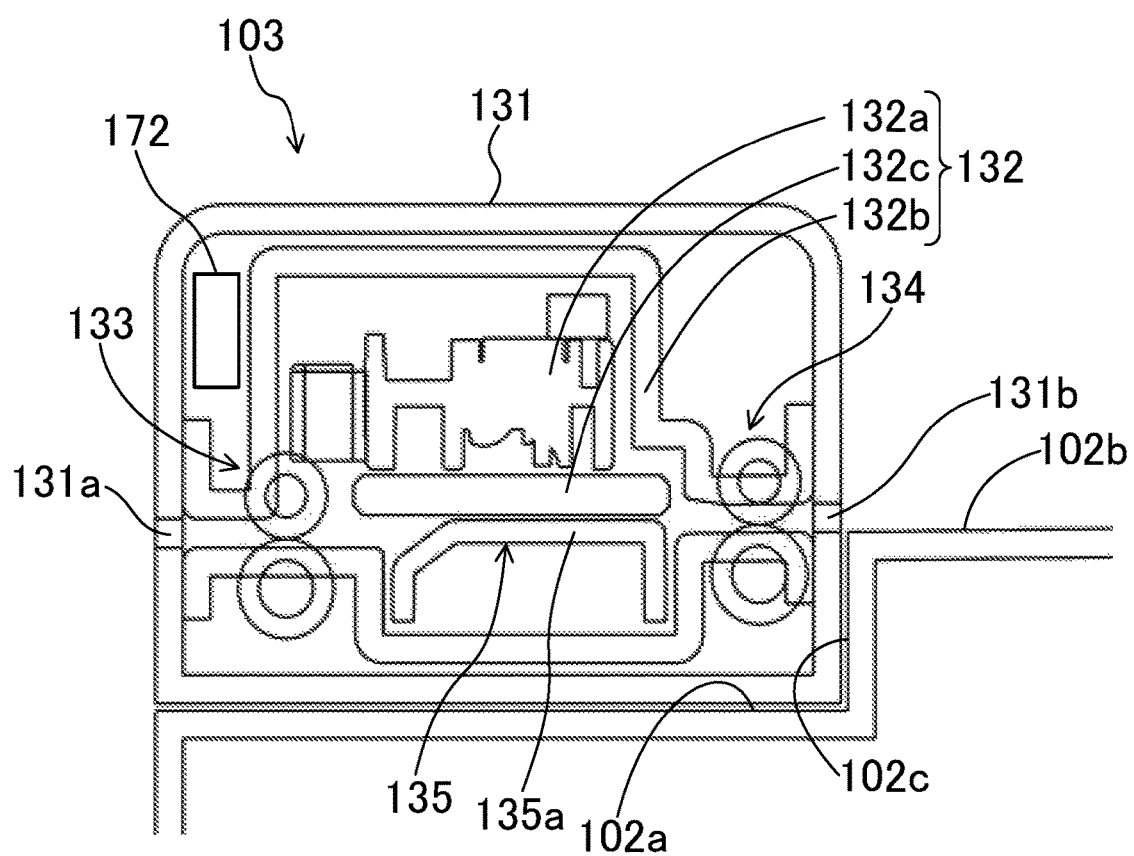
FIG. 13 is an enlarged view illustrating the structure inside a scanner housing.

FIG. 13 illustrates the structure inside the scanner housing 131. The structure inside the scanner housing 131 is the same as that inside the scanner housing 31 described in the description of Embodiment 1; therefore, detailed description thereof is omitted.

[Configuration of Top Surface of Image Forming Apparatus Body]

The top surface of the image forming apparatus body 102 has the above-mentioned scanner attachment surface part 102a to which the scanner device 103 is attached, and a document exit surface part 102b for receiving thereon a document discharged from the scanner device 103 after being subjected to the document image reading operation. The scanner attachment surface part 102a is composed of a bottom surface of a strip-shaped recess formed in a left end of the top surface of the image forming apparatus body 102.

The scanner attachment surface part 102*a* extends horizontally throughout the full front-rear extent of the image forming apparatus body 102.

The document exit surface part 102*b* is composed of a rectangular horizontal surface that occupies the area exclusive of the scanner attachment surface part 102*a* of the top surface of the image forming apparatus body 102. The document exit surface part 102*b* is connected to the scanner attachment surface part 102*a* by a vertical surface part 102*c* that extends in the front-rear direction and forms a wall surface of the recess. The scanner attachment surface part 102*a* is formed at a position lower than the document exit surface part 102*b* by a predetermined amount (equal to the depth of the recess).

The predetermined amount is preferably set such that a lower edge of the document outlet 131*b* is positioned at a height equivalent to but not lower than the height of the document exit surface part 102*b*. The term "equivalent" here means that the height is the same as the height of the document exit surface part 102*b* or there is only a slight difference (for example, 5 mm or less) between them. By way of example, the predetermined amount (depth of the recess) in this embodiment is set such that the lower edge of the document outlet 131*b* is positioned at the same height as the document exit surface part 102*b* (see FIG. 13).

[Operational Effects of Embodiment 3]

In Embodiment 3, as described above, the scanner device 103 is detachably attached to the top surface (scanner attachment surface part 102*a*) of the image forming apparatus body 102 and the top surface (scanner attachment surface part 102*a*) of the image forming apparatus body 102 functions as a guide surface guiding a document when the scanner device 103 is used.

This configuration allows a copying function to be added to the image forming apparatus 101, which has only a printing function, just by additionally attaching the scanner device 103 later to the image forming apparatus 1. Therefore, costs can be saved in comparison to purchasing a new copying machine.

Further, the scanner device 103 has the document inlet 131*a* and the document outlet 131*b* respectively formed in the left and right side surfaces (mutually opposed side surfaces) of the scanner housing 131, and is configured to read an image of a document fed thereinto through the document inlet 131*a* and discharge the document through the document outlet 131*b*. The scanner device 103 can be attached to the image forming apparatus body 102, and the top surface of the image forming apparatus body 102 has the scanner attachment surface part 102*a* to which the scanner device 103 is attached, and the document exit surface part 102*b* onto which a document discharged through the document outlet 131*b* of the scanner device 103 is discharged. The scanner attachment surface part 102*a* is formed at a position lower than the document exit surface part 102*b* by a predetermined amount.

With this configuration, when the scanner device 103 is attached to the image forming apparatus body 102, a part (document exit surface part 102*b*) of the top surface of the image forming apparatus body 102 can be used to receive a document subjected to the document image reading operation. Therefore, it is not necessary to provide a separate document exit tray, which enables reduction of the product cost.

In addition, because the scanner attachment surface part 102*a* is formed at a position lower than the document exit surface part 102*b*, the document outlet 131*b* can be positioned as close as possible to the document exit surface part 102*b* in the height direction. This enables a document discharged through the document outlet 131*b* to be smoothly guided onto the document exit surface part 102*b*. Consequently, document alignment on the document exit surface part 102*b* is improved.

Further, in this embodiment, the difference between the height of the scanner attachment surface part 102*a* and the height of the document exit surface part 102*b* (i.e., the predetermined amount) is set such that the lower end of the document outlet 131*b* of the scanner device 103 is positioned at a height equivalent to but not lower than the height of the document exit surface part 102*b*.

This configuration enables a document discharged through the document outlet 131*b* to be more smoothly guided onto the document exit surface part 102*b*. Therefore, document alignment on the document exit surface part 102*b* is maximally improved.

Further, in this embodiment, the scanner device 103 is configured as an optional device attachable to the image forming apparatus body 102.

This configuration allows the scanner device 103 to be added later to the image forming apparatus 101 which has, for example, only a printing function. Therefore, the user can reduce the initial cost for purchasing the image forming apparatus 101 and also can add a copying function later in response to change in the usage environment.

Furthermore, in this embodiment, the scanner device 103 optionally attached to the image forming apparatus body 102 has a document conveying mechanism (a pair of sheet feed rollers 133 and a pair of sheet discharge rollers 134) incorporated therein. Therefore, it is not necessary to provide a document conveying mechanism on the image forming apparatus body 102, which enables reduction of the size and cost of the image forming apparatus body 102.

Embodiment 4

Figure 14:
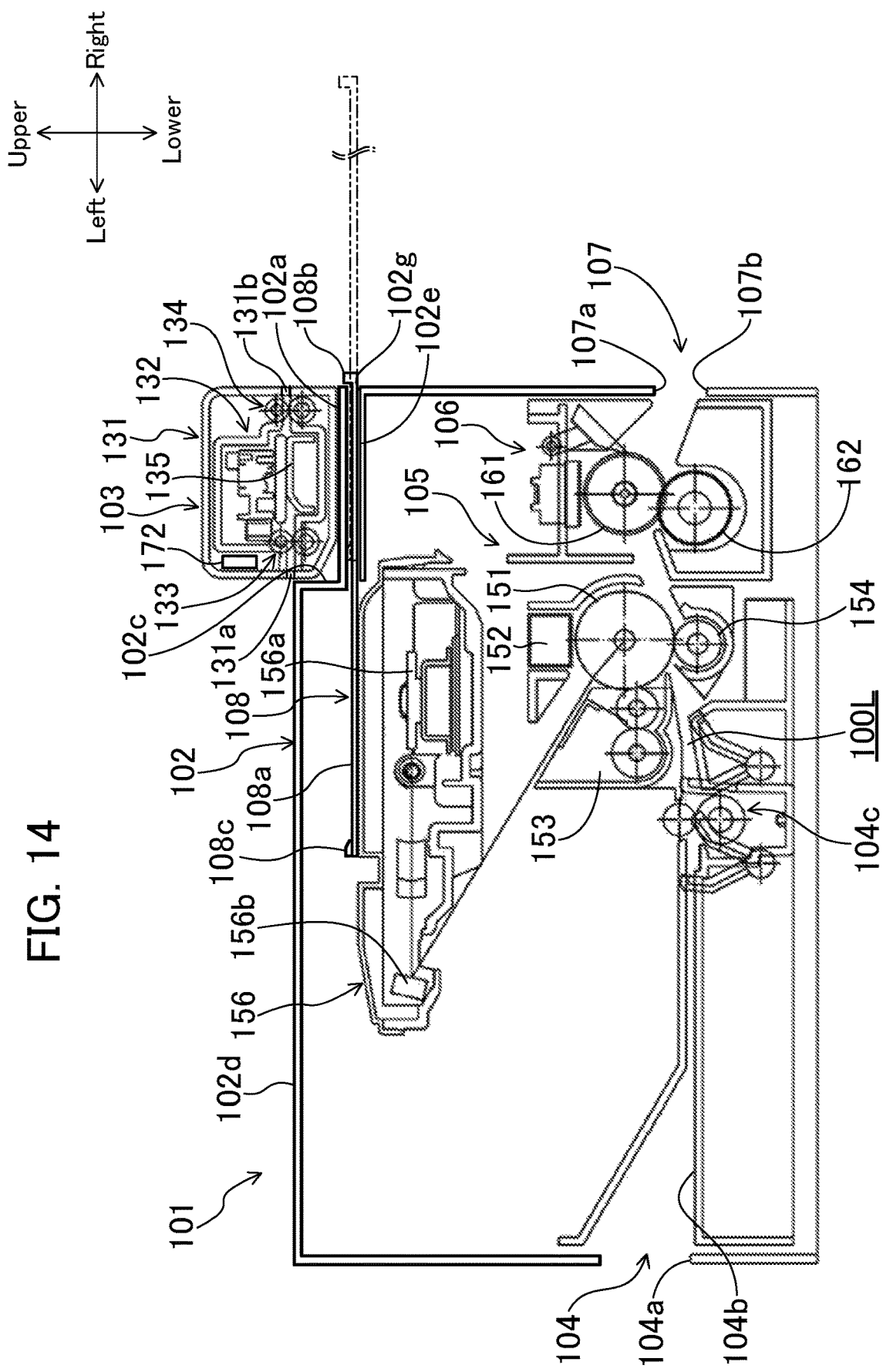
FIG. 14 illustrates Embodiment 4 correspondingly to FIG. 1.

FIG. 14 illustrates Embodiment 4. In Embodiment 4, the position of the scanner attachment surface part 102*a* on the image forming apparatus body 102 is different from that in Embodiment 3. Note that, in FIG. 14, components identical to those in Embodiment 3 are denoted by the same reference numerals as in Embodiment 3 so that detailed description thereof is omitted.

Specifically, in this embodiment, the scanner attachment surface part 102*a* to which the scanner device 103 is attached is formed in a right end of the top surface of the image forming apparatus body 102. Similarly to Embodiment 3, the scanner attachment surface part 102*a* is composed of a bottom surface of a strip-shaped recess formed in a part (in this embodiment, the right end) of the top surface of the image forming apparatus body 102. The scanner attachment surface part 102*a* extends horizontally throughout the full front-rear extent of the image forming apparatus body 102.

The area exclusive of the scanner attachment surface part 102*a* of the top surface of the image forming apparatus body 102 constitutes a document feed surface part 102*d* onto which a document to be fed into the scanner device 103 is placed. The document feed surface part 102*d* is connected to the scanner attachment surface part 102*a* by a vertical surface 102*c* that extends in the front-rear direction and forms a wall surface of the recess.

The scanner attachment surface part 102*a* is formed at a position lower than the document feed surface part 102*d* by a predetermined amount (equal to the depth of the recess).

The predetermined amount is set such that the document feed surface part 102*d* is located at a height not higher than the height of an upper edge of the document inlet 131*a* and not lower than the height of a lower edge of the document inlet 131*a*. By way of example, the predetermined amount (i.e., the depth of the recess) in this embodiment is set such that the lower edge of the document inlet 131*a* is positioned at the same height as the document feed surface part 102*d* (see FIG. 14).

The image forming apparatus body 102 has an insertion opening 102*g* formed in the right side surface thereof near and below the scanner attachment surface part 102*a*, which extends in the front-rear direction. In the insertion opening 102*g*, a document exit tray 108 is inserted in such a manner that it can be pulled out.

The document exit tray 108 has a rectangular, plate-shaped tray body 108*a*. The tray body 108*a* is supported from below by a support board 102*e*. The support board 102*e* is formed on a right side wall of the image forming apparatus body 102 to protrude inward from a position near a lower end of the insertion opening 102*g*. The tray body 108*a* is configured to be slidable in the left-right direction in FIG. 14 in a state of being supported on an upper surface of the support board 102*e*. The tray body 108*a* has a finger hook 108*b* provided on a right edge thereof that slightly protrudes upward so that the user can put his/her finger thereon. The finger hook 108*b* is positioned outside the insertion opening 102*g* of the image forming apparatus body 102. The tray body 108*a* has a stopper 108*c* provided on a right end thereof. The stopper 108*c* slightly protrudes upward from an upper surface of the tray body 108*a*. The image forming apparatus body 102 has a protrusion (not illustrated) provided thereon near the insertion opening 102*g*, which is configured to contact the stopper 108*c* so as to prevent the tray body 108*a* from falling off.

[Operational Effects of Embodiment 4]

In Embodiment 4, as described above, the scanner device 103 is detachably attached to the top surface (scanner attachment surface part 102*a*) of the image forming apparatus body 102 and the top surface (scanner attachment surface part 102*a*) of the image forming apparatus 102 functions as a guide surface guiding a document when the scanner device 103 is used.

This configuration allows a copying function to be added to the image forming apparatus 101, which has only a printing function, just by additionally attaching the scanner device 103 later to the image forming apparatus 101. Therefore, costs can be saved in comparison to purchasing a new copying machine.

Further, the top surface of the image forming apparatus body 102 has the scanner attachment surface part 102*a* to which the scanner device 103 is attached, and the document feed surface part 102*d* onto which a document to be fed to the document inlet 131*a* of the scanner device 103 is placed, and the scanner attachment surface part 102*a* is formed at a position lower than the document feed surface part 102*d* by a predetermined amount. The predetermined amount is set such that the document feed surface part 102*d* is located at a height not higher than the height of the upper edge of the document inlet 131*a* and not lower than the height of the lower edge of the document inlet 131*a*.

With this configuration, a part (document feed surface part 102*d*) of the top surface of the image forming apparatus body 102 can be used to set a document to be subjected to the document image reading operation. Therefore, it is not necessary to provide a separate document feed tray, which enables reduction of the product cost.

In addition, the user can smoothly insert a distal end of a document into the document inlet 131*a* by setting the document on the document feed surface part 102*d* and sliding the document from the left to the right. Therefore, the document is prevented from being folded or teared when it is inserted into the document inlet 131*a*.

Furthermore, in this embodiment, the image forming apparatus body 102 has the insertion opening 102*g* formed in the right side surface thereof, and the document exist tray 108 is inserted in the insertion opening 102*g* in such a manner that it can be pulled out.

Therefore, a document discharged through the document outlet 131*b* of the scanner device 103 can be received on the document exit tray 108 as pulled out of insertion opening 102*g*.

OTHER EMBODIMENTS

The technology disclosed herein may be implemented with the configurations described below in the above-described embodiments.

In Embodiments 1 and 2, the slider 8 is moved in the rail groove 2*b*. However, the present disclosure is not limited thereto, and an Accuride slide rail or a combination of a rail and a roller may be employed instead.

In the above-described embodiments, the scanner device 3, 103 has the CIS sensor 32, 132 incorporated therein as an image sensor. However, the present disclosure is not limited thereto, and, for example, a CCD sensor or any other suitable sensor may be employed instead.

Further, in the above-described embodiments, an example configuration is described in which the direction of the feed of a document by the scanner device 3, 103 and the direction of the feed of a sheet by the image forming apparatus body 2, 102 are coincident with each other in plan view. However, the present disclosure is not limited thereto, and, for example, these directions may be perpendicular to each other.

In Embodiment 4, the document exit tray 108 is pulled out of the image forming apparatus body 102 for use. However, the present disclosure is not limited thereto, and, for example, the document exit tray 108 may be pivotably provided on an upper end of the right side surface of the image forming apparatus body 102.

In Embodiments 3 and 4, the scanner attachment surface part 102*a* is formed at an end on the top surface of the image forming apparatus body 102 However, the present invention is not limited thereto, and, for example, the scanner attachment surface part 102*a* may be formed at the center in the left-right direction or the center in the front-rear direction on the top surface of the image forming apparatus body 102.

What is claimed is:

1. An image forming apparatus comprising:
   a scanner device having a document inlet and a document outlet respectively formed in mutually opposed surfaces thereof, the scanner device being configured to read an image of a document fed thereinto through the document inlet and discharge the document through the document outlet; and
   an image forming apparatus body to which the scanner device is attached,
   wherein:
   the scanner device is detachably attached to a top surface of the image forming apparatus body;
   the scanner device is rotatable between two side surfaces of the image forming apparatus body about an axis vertical to the top surface of the image forming apparatus body on a fulcrum provided at a corner of the top surface of the image forming apparatus body in a state of being attached to the top surface of the image forming apparatus body, the two side surfaces of the image forming apparatus body being perpendicular to each other with the corner of the top surface therebetween as viewed in plan view; and the top surface of the image forming apparatus body functions as a guide surface guiding the document when the scanner device is used.

2. The image forming apparatus of claim 1, wherein:

one of the two side surfaces of the image forming apparatus body has formed therein a sheet inlet through which a sheet for printing is fed into the image forming apparatus body, and has provided thereon a sheet feed tray onto which the sheet to be fed to the sheet inlet is placed.

3. The image forming apparatus of claim 1, wherein the scanner device is configured as an optional device later-attachable to the top surface of the image forming apparatus body.

\* \* \* \* \*